(12) United States Patent
Dutau

(10) Patent No.: US 8,274,185 B2
(45) Date of Patent: Sep. 25, 2012

(54) ROTORS FOR ELECTRIC ROTARY MACHINES

(75) Inventor: Alexis Dutau, Angouleme (FR)

(73) Assignee: Moteurs Leroy-Somer, Angoweme (FR)

( * ) Notice: Subject to any disclaimer, the term of this patent is extended or adjusted under 35 U.S.C. 154(b) by 336 days.

(21) Appl. No.: 12/681,530

(22) PCT Filed: Jan. 7, 2010

(86) PCT No.: PCT/IB2010/050053
§ 371 (c)(1),
(2), (4) Date: May 14, 2010

(87) PCT Pub. No.: WO2010/079455
PCT Pub. Date: Jul. 15, 2010

(65) Prior Publication Data
US 2011/0001372 A1    Jan. 6, 2011

(30) Foreign Application Priority Data
Jan. 7, 2009  (FR) ..................................... 09 00030

(51) Int. Cl.
*H02K 3/24* (2006.01)
(52) U.S. Cl. ........................ 310/65; 310/61; 310/216.119
(58) Field of Classification Search .................... 310/52, 310/58, 59, 60 A, 60 R, 61, 64–66, 216.107, 310/216.119, 216.125, 216.126, 194, 203, 310/214
See application file for complete search history.

(56) References Cited

U.S. PATENT DOCUMENTS

| 3,846,651 A | 11/1974 | Mishra | |
| 4,433,262 A * | 2/1984 | Greenlee | 310/214 |
| 4,513,218 A | 4/1985 | Hansen | |
| 6,054,790 A * | 4/2000 | Kjeer et al. | 310/214 |
| 6,661,133 B2 * | 12/2003 | Liebermann | 310/58 |
| 7,015,617 B2 * | 3/2006 | Tornquist et al. | 310/216.121 |
| 7,061,154 B2 * | 6/2006 | McDowall et al. | 310/214 |
| 7,342,331 B2 * | 3/2008 | Down et al. | 310/51 |
| 2003/0184180 A1 * | 10/2003 | Doherty et al. | 310/214 |
| 2008/0252155 A1 * | 10/2008 | Waddell et al. | 310/58 |

FOREIGN PATENT DOCUMENTS

| DE | 209964 | 7/1908 |
| EP | 1 876 686 A1 | 1/2008 |
| FR | 2 465 349 | 3/1981 |
| GB | 2 425 662 A | 11/2006 |
| SU | 1101970 A | 7/1984 |

* cited by examiner

*Primary Examiner* — Quyen Leung
*Assistant Examiner* — Naishadh Desai
(74) *Attorney, Agent, or Firm* — Oliff & Berridge, PLC

(57) ABSTRACT

The present invention provides a rotor for a rotary electric machine, the rotor extending along a longitudinal axis and comprising:

at least two poles defining between them an inter-pole space; and windings of electrical conductors wound around the poles, said windings including straight portions extending along the longitudinal axis of the rotor;

at least one pole of the rotor, and in particular each pole of the rotor, including a spacer placed along at least a fraction of the straight portion between at least two conductor groups of the windings so as to form at least one cooling channel between the two conductor groups, enabling a cooling fluid to flow longitudinally and/or transversely within the windings, the spacer including at least one spacer element presenting a cross-section that is hollow, defining the cooling channel at least in part.

23 Claims, 14 Drawing Sheets

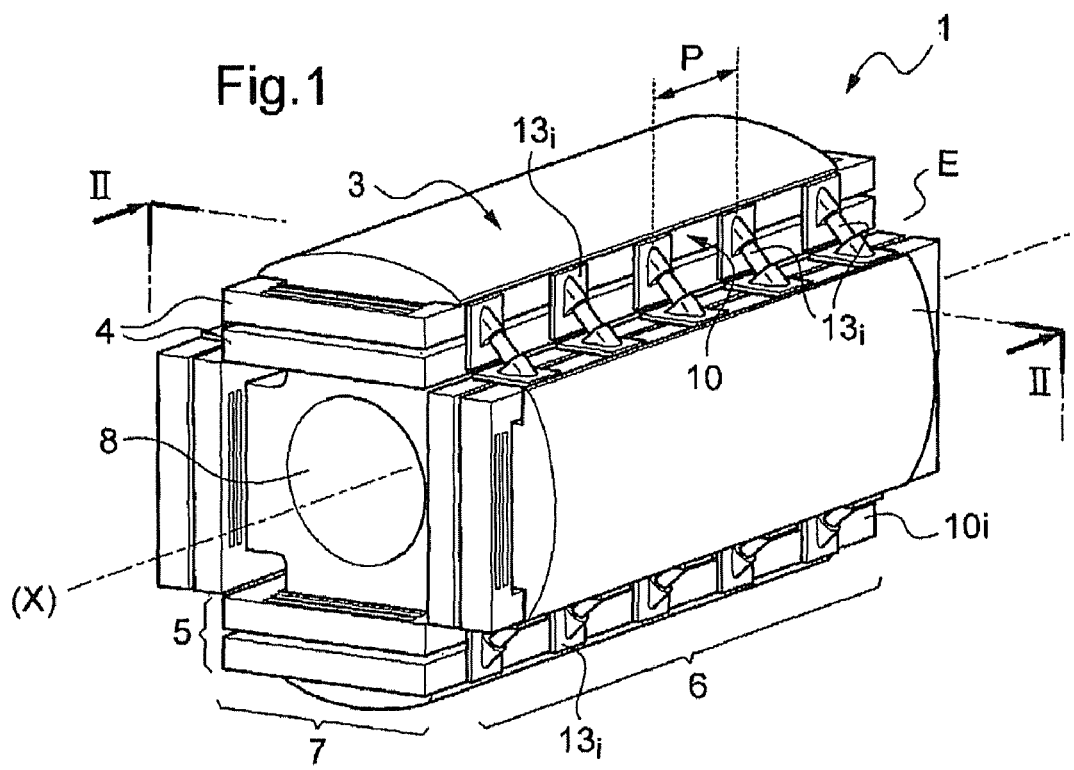

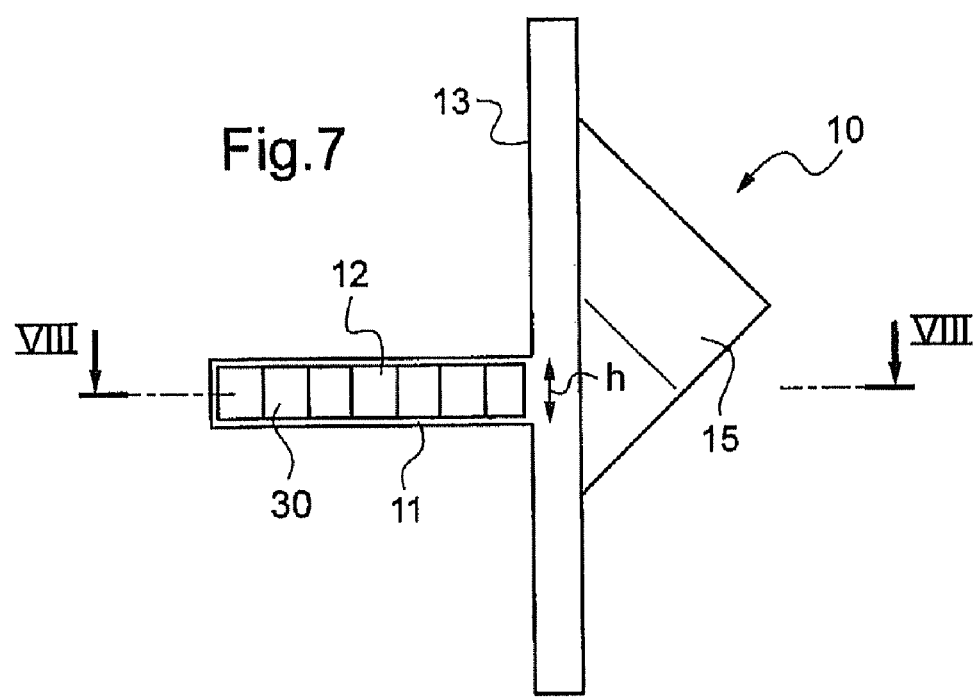
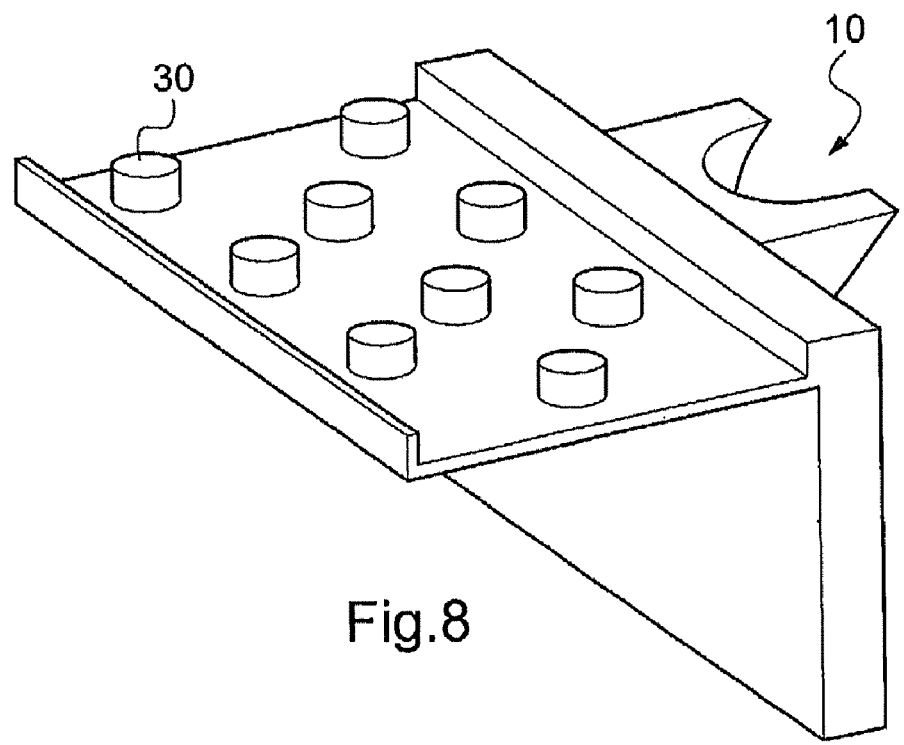

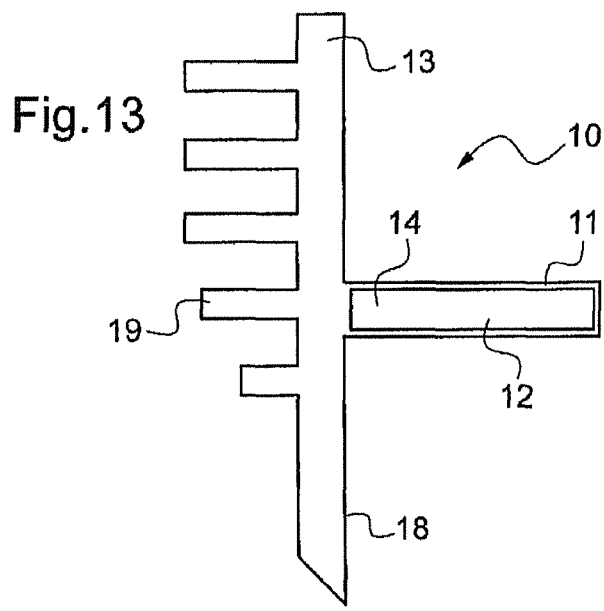
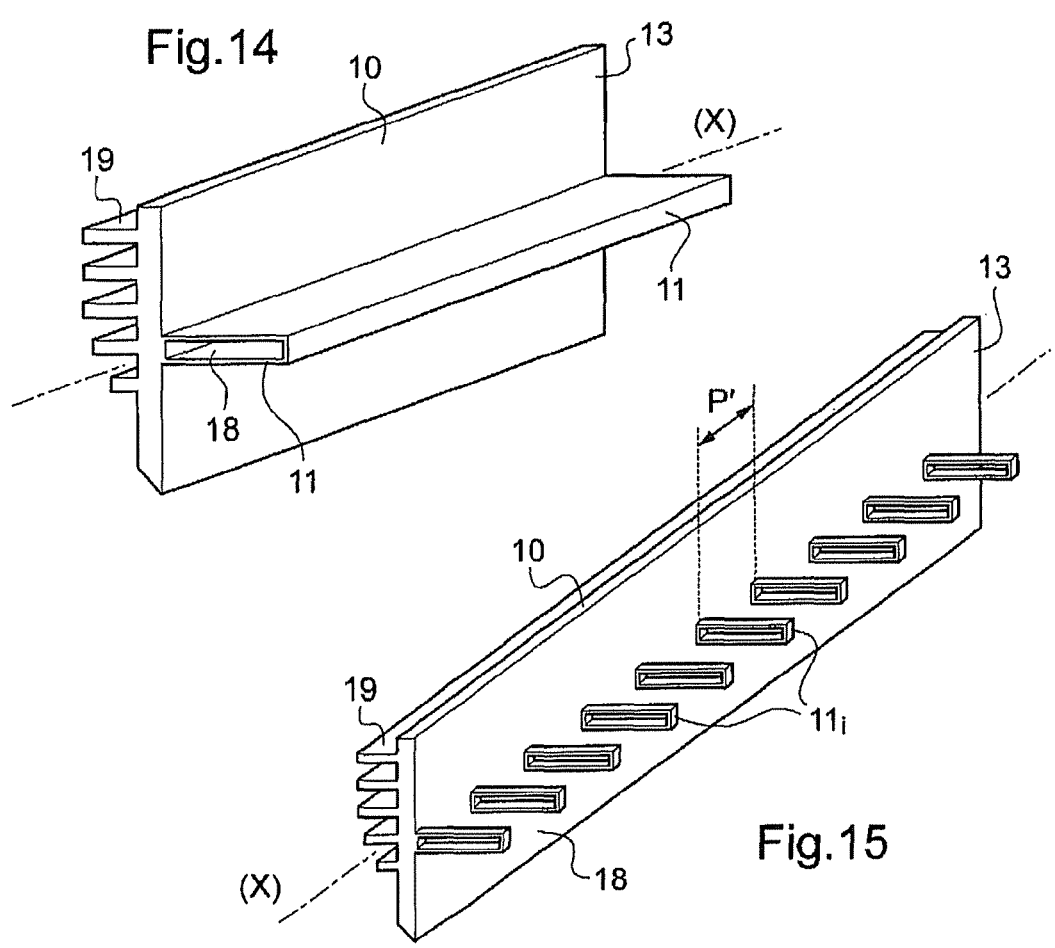

ROTORS FOR ELECTRIC ROTARY MACHINES

The present invention provides a wound rotor for a rotary electric machine.

The present invention applies more particularly but not exclusively to cooling rotor windings, in particular in rotary electric machines that are open, that are single-phase or polyphase, that present a speed of rotation lying in the range 0 to 6000 revolutions per minute (rpm), and that operate at a power that is less than or equal to 25 megawatts (MW).

The term "open rotary electric machine" designates a machine that is cooled by a flow of air taken from outside the machine.

In order to cool the windings of a rotor, it is known to make the windings with overhangs that are ventilated and with winding portions extending parallel to the axis of rotation of the machine, also referred to as "straight portions" that are held in place by clamps.

U.S. Pat. No. 4,513,218 discloses using the interstices left in the straight portions of the windings to cause a cooling fluid to circulate.

U.S. Pat. No. 6,661,133 discloses placing a channel between the windings and the magnetic laminations forming the pole bodies of the rotor, which channel extends along the straight portions of the windings, with a cooling fluid flowing therein.

Application GB 2 425 662 discloses a rotor for a rotary electric machine, the rotor having poles with windings of electrical conductors wound thereabout. Solid strips are placed between two winding conductor groups.

There exists a need to further improve the cooling of the windings of a rotary electric machine.

In one of its aspects, the invention provides a rotor for a rotary electric machine, the rotor extending along a longitudinal axis and comprising:

at least two poles defining between them an inter-pole space; and windings of electrical conductors wound around the poles, said windings including straight portions extending along the longitudinal axis of the rotor;

at least one pole of the rotor, and in particular each pole of the rotor, including a spacer placed along at least a fraction of the straight portion between at least two conductor groups of the windings so as to form at least one cooling channel between the two conductor groups, enabling a cooling fluid to flow longitudinally and/or transversely within the windings.

The invention serves to improve heat exchange within the windings and, by splitting the windings into conductor groups between which cooling fluid can flow, it serves to improve significantly the thermal effectiveness with which the rotor is cooled, while also being relatively simple to implement.

The term "conductor groups" should be understood very broadly, where a conductor group in the meaning of the invention may be constituted in section in a cross-section plane perpendicular to the longitudinal axis of the rotor, by one or more electrical conductors, preferably by 10 to 300 conductors, which conductors may touch one another within the group. The spacing between two adjacent groups, as a result of the spacer, may lie in the range 2 millimeters (mm) to 40 mm, and the cooling fluid may flow in the cooling channel along a flow section lying in the range 40 square millimeters (mm$^2$) to 4000 mm$^2$. The greatest transverse dimension of the cooling channel may lie in the range 10 mm to 200 mm, for example.

When the cooling fluid is air, the cooling channel is referred to as a "ventilation channel".

The term "ventilation channel" is used below even though the invention is not limited to air as the cooling channel.

By way of example, at least one pole of the rotor, e.g. each pole, includes a spacer that extends continuously along at least a fraction of the length of the straight portions of the windings, e.g. over at least half, or indeed over the entire length of the straight portions, so that the ventilation channel allows cooling fluid to flow only longitudinally within the windings.

By way of example, the spacer comprises a support extending continuously along at least a fraction of the length of the straight portion, e.g. along at least half the length thereof, and the ventilation channel is closed laterally by the support so as to prevent the cooling fluid from flowing transversely.

Such a spacer may have a single spacer element extending between the two conductor groups continuously all along the longitudinal axis.

In a variant, the spacer comprises a plurality of spacer elements placed along the longitudinal axis, the spacer elements being spaced apart for example at an optionally constant pitch along the ventilation channel, with the value of the pitch lying for example in the range 10 mm to 200 mm, as measured between the centers of two adjacent spacer elements.

Because of the discontinuities between consecutive spacer elements, a spacer comprising a plurality of spacer elements may serve to increase the heat exchange area between the electrical conductors of the windings and the cooling fluid, and consequently it may serve to further improve the cooling of the windings.

In a variant, or in combination with the above, at least one pole of the rotor or indeed each pole, may include a spacer that extends discontinuously along at least a fraction of the length of the straight portion, in particular over half the length or indeed the entire length of the straight portion, so as to provide at least one ventilation channel enabling the cooling fluid to flow within the windings both transversely and longitudinally.

By way of example, the spacer comprises a plurality of support elements, e.g. placed in the inter-pole space along the longitudinal axis, each support element comprising a spacer element and being placed optionally regularly along the longitudinal axis.

With such a spacer, the ventilation channel may be closed, e.g. laterally only, level with each support element. Between two support elements, it is possible for cooling fluid to flow, e.g. transversely, in the ventilation channel, thereby enabling the cooling of the electrical conductors of the windings to be further improved.

The spacer element(s) may present a cross-section that is hollow, defining the ventilation channel, at least in part. This may facilitate the flow of cooling fluid and limit the head losses of the rotor.

The spacer element(s) may present disturbers over at least a fraction of their length(s), in particular along their entire length(s), which disturbers project into the ventilation channel. Such disturbers may create baffles within the ventilation channel and act as flow disturbers for further improving heat exchange by increasing the heat exchange coefficients and the heat exchange area between the spacer and the cooling fluid.

By way of example, the disturbers may extend over at least a fraction of the height of the ventilation channel, in particular over the entire height of the ventilation channel.

In an embodiment of the invention, the spacer includes spacer elements that are made using one or more stops inserted in the straight portion between two electrical conductor groups of the windings. The stops may be hollow or solid.

In another embodiment of the invention, the spacer is incorporated in a system for clamping the electrical conductors in the straight portion.

In another embodiment of the invention, the spacer includes spacer elements that are formed by projections made integrally with the magnetic laminations of the rotor, e.g. with each rotor lamination, thus making it possible to avoid introducing additional parts for making the ventilation channels and further improving heat exchange between the magnetic laminations of the rotor and the cooling fluid. These projections may be hollow or solid.

The spacer may include two spacer elements placed between at least two distinct electrical conductor groups of the windings associated with a pole of the rotor, these spacer elements defining at least two superposed ventilation channels.

The ratio of the accumulated total height of the ventilation channel(s) formed within the straight portions of the windings of a pole to the total height of the electrical conductors of the winding in the corresponding slot of the rotor, as measured parallel to the axis along which a pole extends, may lie for example in the range 1% to 50%, in particular in the range 10% to 30%.

The ratio of the width of the ventilation channel formed within the straight portions of the windings to the width of the slot as measured perpendicularly to the axis along which a pole extends, may for example be greater than 20%, in particular greater than 70%, thereby facilitating the flow of cooling fluid within the ventilation channel.

By way of example, the poles of the rotor are projecting poles, each comprising a pole body and pole shoes, and the spacer in the straight portions of the windings of at least one pole of the rotor, and in particular of each pole of the rotor, may include at least one second spacer element placed along at least a fraction of the straight portion, in particular along at least half the length of the straight portion or over the entire length of the straight portion between a conductor group of the windings and a pole shoe.

The spacer in the straight portions of the windings of at least one pole of the rotor, and in particular of each pole of the rotor, may include at least one third spacer element placed along at least a fraction of the straight portion, in particular at least half the length of the straight portion or along the entire length of the straight portion, between a conductor group of the windings and the bottom of the inter-pole space.

The spacer in the straight portions of the windings of at least one pole of the rotor, in particular of each pole of the rotor, may include at least one fourth spacer element placed along at least a fraction of the straight portion, in particular at least half the length of the straight portion or along the entire length of the straight portion, between the conductor groups of the windings and the pole body.

It is thus possible for each pole to obtain a flow of cooling fluid that is longitudinal and/or transverse within the straight portions of the windings, a flow between the windings and the pole shoes of the pole, a flow between the windings and the bottoms of the inter-pole spaces, and a flow between the straight portions of the windings and the pole body. The straight portions of the windings of a pole may include at least four ventilation channels: at least one ventilation channel between two conductor groups, a ventilation channel between the windings and the pole shoe, a ventilation channel between the windings and the bottom of the inter-pole space, and a ventilation channel between the windings and the pole body.

The spacer in the straight portion may include only one second spacer element and/or only one third spacer element and/or only one fourth spacer element as described above.

In a variant, the spacer in the straight portion may include a plurality of second and/or third and/or fourth spacer elements optionally regularly spaced apart along at least a fraction of the straight portion, e.g. along at least half the length of the straight portion or indeed along the entire length of the straight portion.

The second and/or third and/or fourth spacer elements may present a cross-section that is solid or hollow.

At least one pole of the rotor may include at least one spacer in the winding overhangs, the spacer being placed between at least two conductor groups of the winding overhangs.

Such a spacer in the winding overhangs may for example be made using endpieces fastened to main brackets of the winding overhangs.

In another of its aspects, the invention also provides a rotary electric machine including a rotor as defined above.

By way of example, the cooling fluid is air. The machine may have one or more fans optionally driven by the rotor, in order to create a forced flow of air in the various ventilation channels.

The invention can be better understood on reading the following description of non-limiting embodiments thereof, and on examining the accompanying drawings, in which:

FIG. 1 is a diagrammatic and fragmentary perspective view of an example rotor of the invention;

FIG. 2 is a cross-section on II-II of FIG. 1;

FIGS. 5 to 10 show embodiments of spacer-forming means;

FIGS. 13 to 20 show other embodiments of spacer-forming means;

Figure 3:
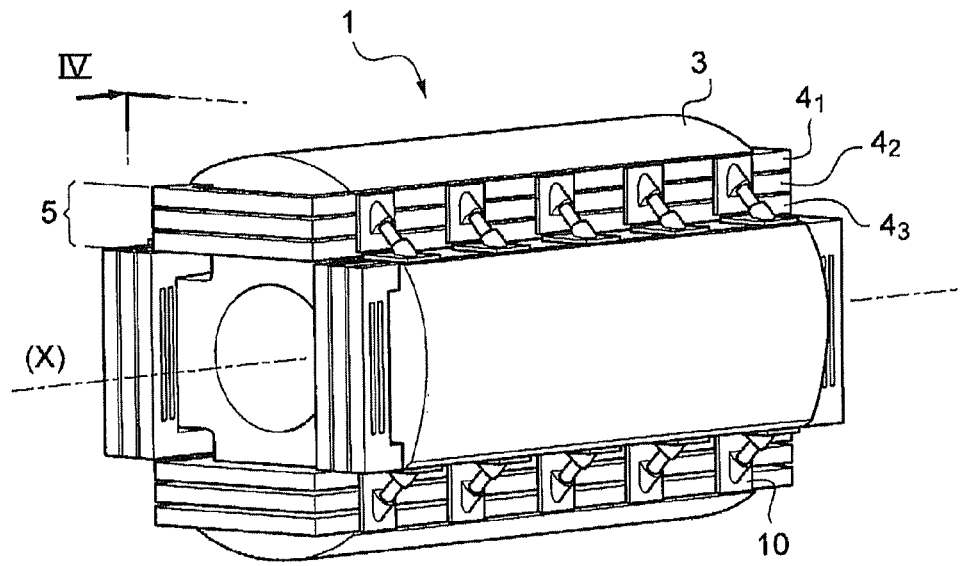
FIG. 3 is a diagrammatic and fragmentary perspective view of another example rotor of the invention.

FIG. 1 shows a first rotor example 1 that extends along a longitudinal axis X and that comprises a stack of assembled-together magnetic laminations 2 forming projecting poles, a housing 8 being formed in the stack of laminations to receive a shaft that is not shown.

As can be seen in FIG. 1, each pole in this example describes a pole body 20 with pole shoes 3 and two adjacent poles defining between them an inter-pole space E forming a slot 33.

In the example shown, the rotor 1 has four poles, but the invention is not limited to some particular number of poles.

The rotor 1 also includes electrical conductors 4 wound around each pole and defining windings 5. Each winding has a go-and-return straight portion 6 extending substantially along the longitudinal axis X and defining a winding overhang 7 in each longitudinal end region of the rotor 1.

As can be seen in FIG. 2, a ventilation channel 40 is formed in the bottom of the slot 33 under the windings 5 of two adjacent poles.

Another ventilation channel 41 is also formed in the interpole space E outside the windings 5 of two adjacent poles.

In the example of FIGS. 1 and 2, each pole of the rotor 1 includes a spacer 10 in the straight portion 6, which spacer is positioned over substantially the entire length of the straight portion 6 of the windings of each pole, for example.

As can be seen in FIGS. 1 and 2, the spacer 10 in the example described extends discontinuously along the longitudinal axis X of the rotor 1. By way of example, the spacer 10 comprises a plurality of support elements $13_i$ that may be spaced apart in optionally regular manner along the longitudinal axis X. By way of example, two adjacent support elements $13_i$ are spaced apart at a pitch P lying in the range 10 mm to 200 mm.

By way of example, each support element $13_i$ extends along the longitudinal axis X over a length lying in the range 10 mm to 100 mm.

Figure 5:
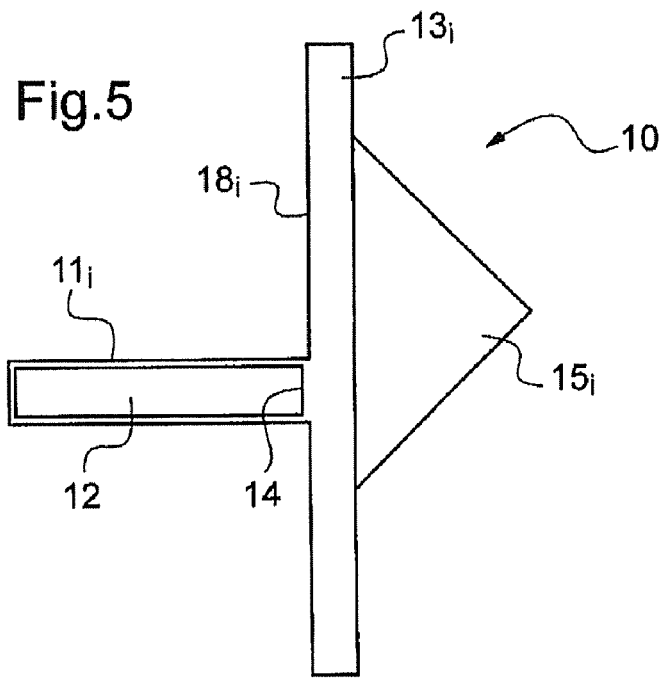
Figure 6:
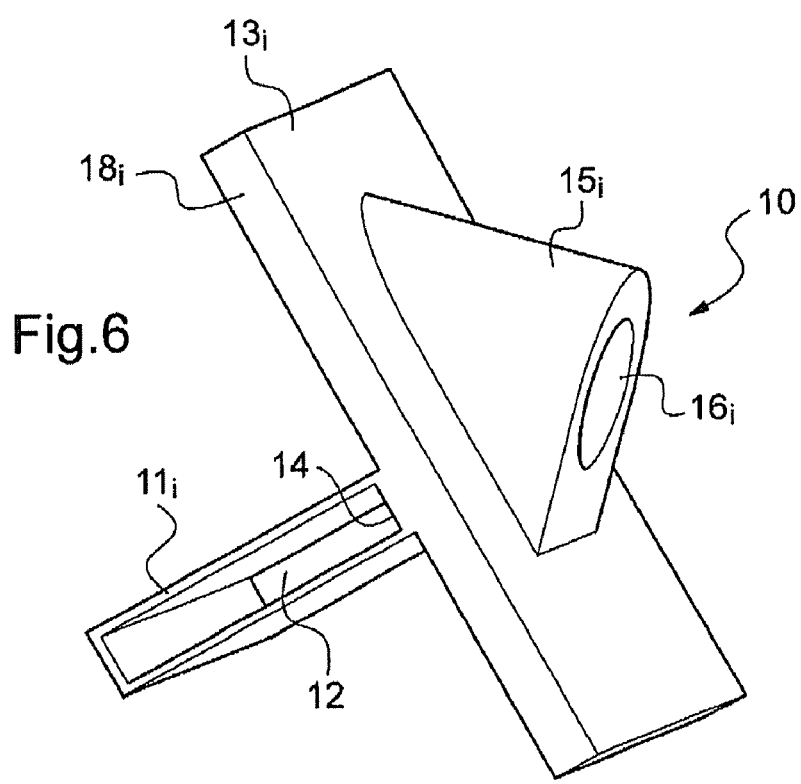

FIGS. 5 and 6 show an example of such a support element $13_i$. Each support element $13_i$ includes a spacer element $11_i$ that is placed between two electrical conductor groups $4_1$ and $4_2$.

In this example, the support elements $13_i$ are incorporated in a winding clamp system 5, with such a clamp system being described for example in application EP 1 876 686 in the name of the Applicant.

The support element $13_i$ includes an inclined block $15_i$ having a housing $16_i$ for receiving the first end of a bar $17_i$ having its second end received in a similar support element $13_i$ placed in the straight portion 6 of the windings of the adjacent pole, as shown in FIGS. 1 and 2.

As can be seen in FIGS. 5 and 6, the spacer element $11_i$ may present a cross-section that is hollow, said section defining part of a cooling channel 12 suitable for conveying a cooling fluid.

In the example described, the cooling fluid is air and the channel is referred to below as a ventilation channel, however the invention is not limited to this particular example of a cooling fluid.

By way of example, the support elements $13_i$ are made of aluminum or of plastics material, and the spacer elements $11_i$ are made of aluminum, for example.

In the example described, the electrical conductors 4 forming the windings 5 within a group are touching, and the interstices that appear when superposing two successive layers of electrical conductors 4 are filled in with an impregnation resin.

As can be seen in FIG. 2, the ratio between the height h of the ventilation channel 12 and the total height H–h of the electrical conductors 4 of the windings 5 in a slot 30 of the rotor lies for example in the range 1% to 50%.

The ratio of the width l of the ventilation channel 12, possibly after subtracting the width or the diameter of one or more disturbing elements obstructing the channel in part, where appropriate, to the width L of the notch is greater than 20%, for example. In the meaning of the invention, the width of a notch should be understood as being the width of a pole shoe, as shown in FIG. 2.

In the example of FIGS. 1 and 2, each support element $13_i$ has a face $18_i$ that extends over the entire length of the support element $13_i$, said face $18_i$ being pressed against a transverse end 14 of the ventilation channel 12.

Thus, in each support element $13_i$, because the face $18_i$ is present against the transverse end 14 of the ventilation channel 12, flow of cooling fluid is possible within the ventilation channel 12 in a longitudinal direction only, whereas between two support elements $13_i$, the ventilation channel 12 is not closed laterally by the face $18_i$, thus enabling the cooling fluid to flow both longitudinally and transversely in the ventilation channel 12.

The invention is not limited to a spacer that allows only one ventilation channel 12 to be created within the straight portion 6 of the windings 5.

Figure 4:
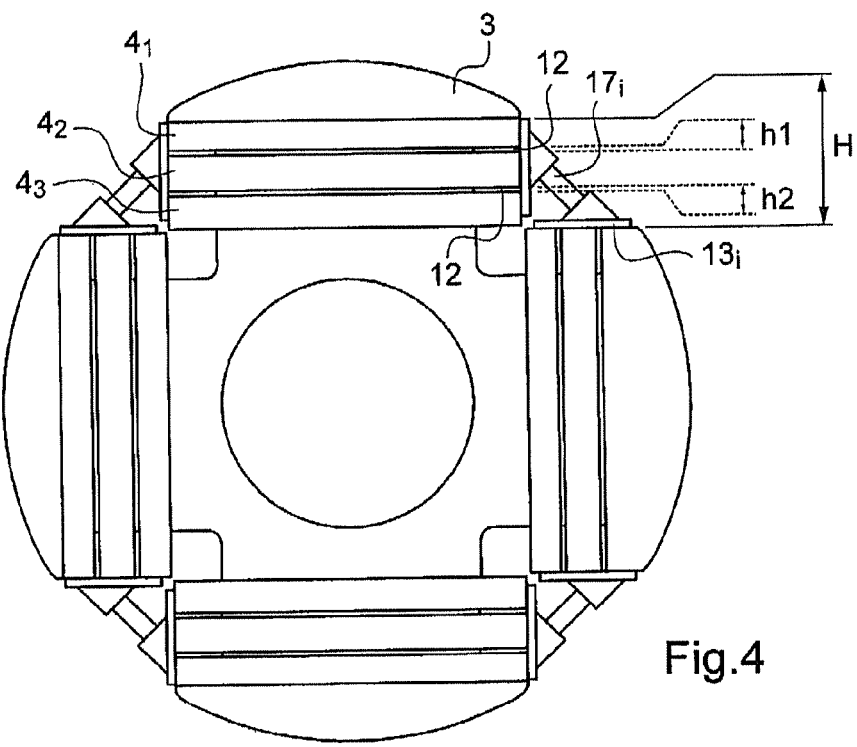
FIG. 4 is an end view looking along arrow IV of FIG. 3.

In the example shown in FIGS. 3 and 4, each support element $13_i$ has two spacer elements each placed between two groups of conductors firstly $4_1$ & $4_2$, and secondly $4_2$ & $4_3$. The straight portions 6 shown in FIG. 3 thus present two superposed ventilation channels 12.

In this example, the ratio of the accumulated height h1+h2 of the ventilation channels 12 formed within the straight portion 6 of the windings 5 to the total height H–h1–h2 of the electrical conductors 4 of the windings in a slot of the rotor lies in the range 1% to 50%.

FIGS. 7 to 10 show spacer elements $11_i$ that differ from those described with reference to FIGS. 5 and 6 by the presence of the disturbers 30 projecting into the ventilation channel 12. By way of example, each spacer element $11_i$ has a plurality of such disturbers 30. These disturbers may extend over a fraction only of the height h of the ventilation channel 12, or in a variant they may extend over the entire height h of the ventilation channel 12.

By way of example, these disturbers 30 are made integrally with the spacer element $11_i$. In a variant, the disturbers are fitted to the spacer element $11_i$.

In the example of FIGS. 7 and 8, where FIG. 8 is a cross-section on VIII-VIII of the element $10_i$ of FIG. 7, the disturbers 30 comprise studs.

Figure 9:
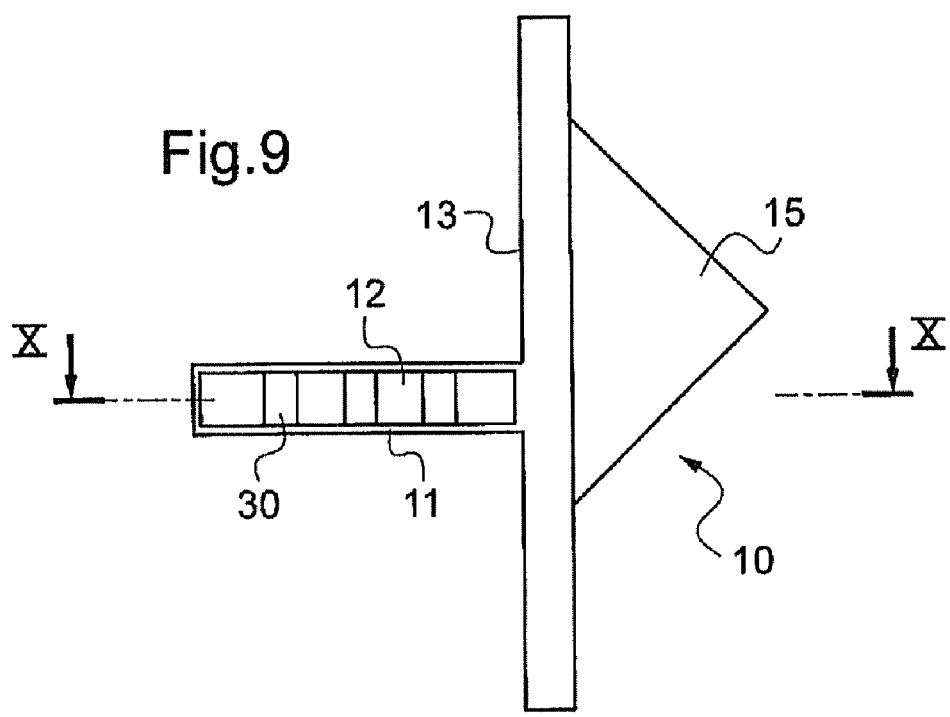
Figure 10:
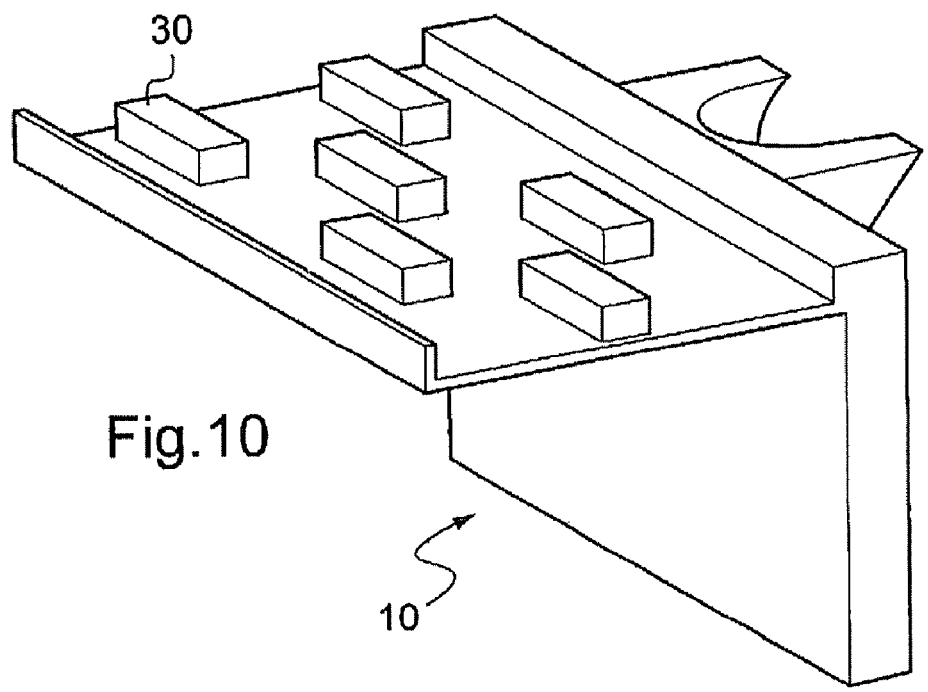

In the example of FIGS. 9 and 10, where FIG. 10 is a cross-section on X-X of the element $10_i$ in FIG. 9, the disturbers comprise splines, e.g. placed in a staggered configuration along the longitudinal axis.

Figure 11:
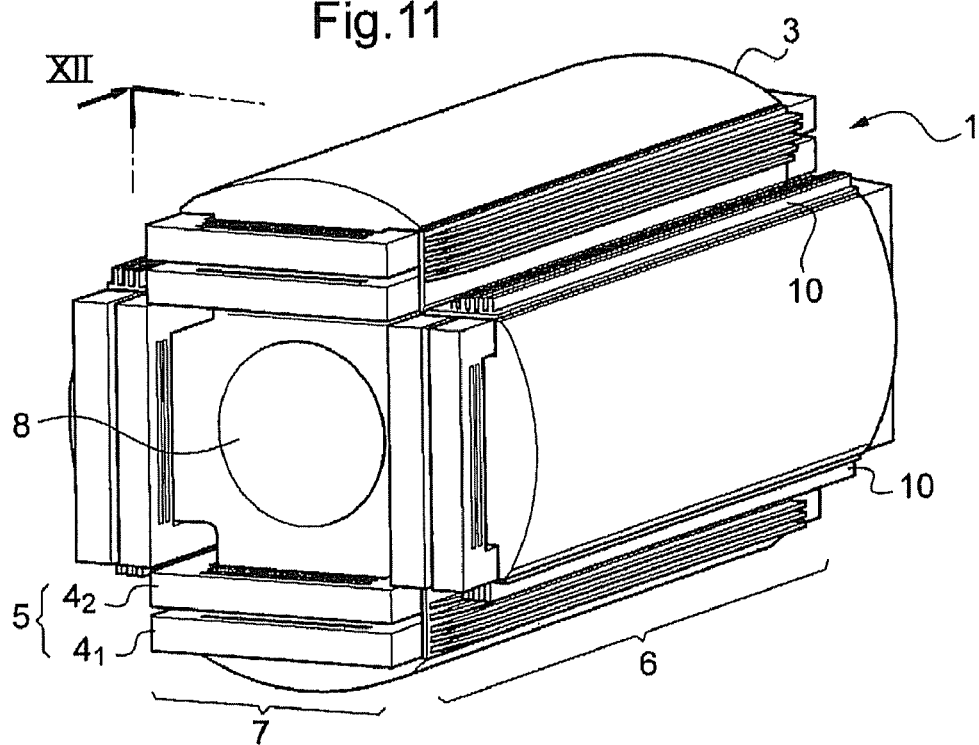
FIG. 11 is a perspective view of another example rotor of the invention.
Figure 12:
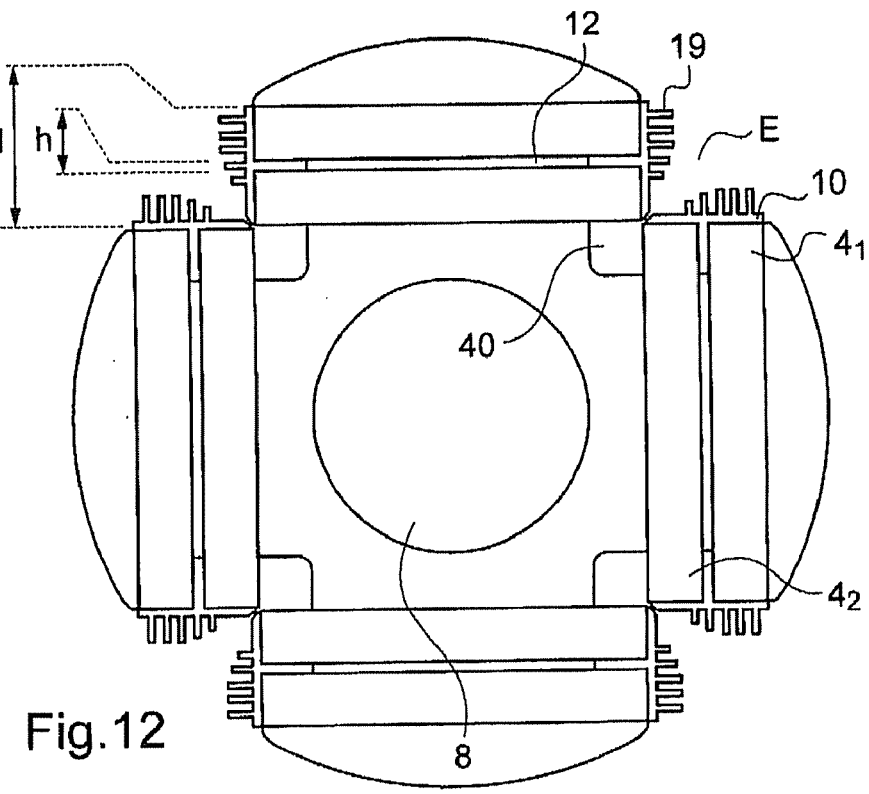
FIG. 12 is an end view looking along XII of FIG. 11.

FIGS. 11 and 12 show another rotor element of the invention.

In this example, the spacer 10 extends continuously over the entire length of the straight portion 6 of the windings 5.

FIGS. 13 to 15 show, in isolation, examples of spacers 10 in the straight portion 6 for a rotor as shown in FIGS. 11 and 12.

As can be seen in FIG. 13, the spacer 10 may comprise one or more spacer elements $11_i$ presenting a hollow cross-section, together with a support 13 that extends in this example continuously over the entire length of the straight portion 6 along the longitudinal axis X.

The support 13 has a face 18, and it has a plurality of fins 19 formed on its face opposite from the face 18.

In the example shown in FIG. 14, the spacer 10 has only one spacer element 11, which element extends continuously along the longitudinal axis X.

The spacer element 11 has a hollow cross-section that, in this example, defines the ventilation channel 12.

In the example of FIG. 15, the spacer 10 has a plurality of spacer elements $11_i$ regularly spaced along the longitudinal axis X, these spacer elements $11_i$ defining the ventilation channel 12 in part only. By way of example, each spacer element $11_i$ is spaced apart from adjacent elements $11_i$ by a pitch P' lying in the range 10 mm to 200 mm, and each spacer element $11_i$ extends over a length lying in the range 10 mm to 100 mm.

In the examples of FIGS. 13 to 15, a transverse end 14 of the ventilation channel 12 is closed over the entire length of the straight portion 6 by the face 18, so as to allow the cooling fluid, here ambient air, to flow in the longitudinal direction only.

In a variant, the spacer 10 of FIGS. 13 to 15 may include at least two spacer elements 11 that are arranged so as to provide at least two ventilation channels that are superposed within the straight portion 6 of the windings, similar to that described with reference to FIGS. 3 and 4.

Figure 16:
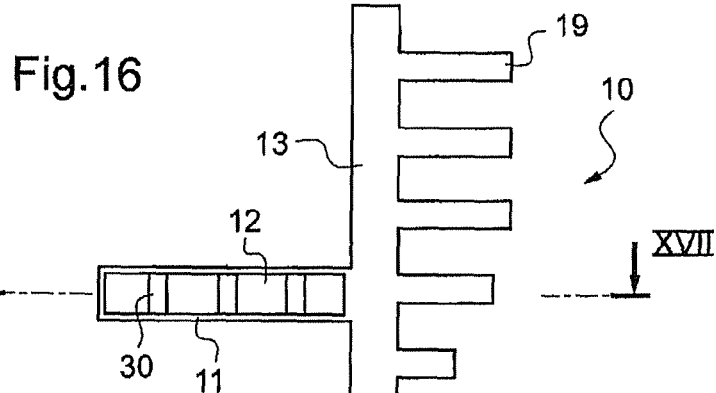

FIGS. 16 to 19 show spacer elements in the straight portion 6 that include, in contrast with those described with reference to FIGS. 13 to 15, disturbers 30 that project into the ventilation channel 12. In the example of FIG. 16, the spacer element 11 or each spacer element $11_i$ has, for example, a plurality of disturbers 30. These disturbers may extend over a fraction only of the height $\underline{h}$ of the ventilation channel 12, or in a variant they may extend over the full height $\underline{h}$ of the ventilation channel 12.

By way of example, these disturbers 30 are made integrally with the spacer element 11 or with each spacer element $11_i$. In a variant, the disturbers are fitted on the spacer element 11 or on each spacer element $11_i$.

Figure 17:
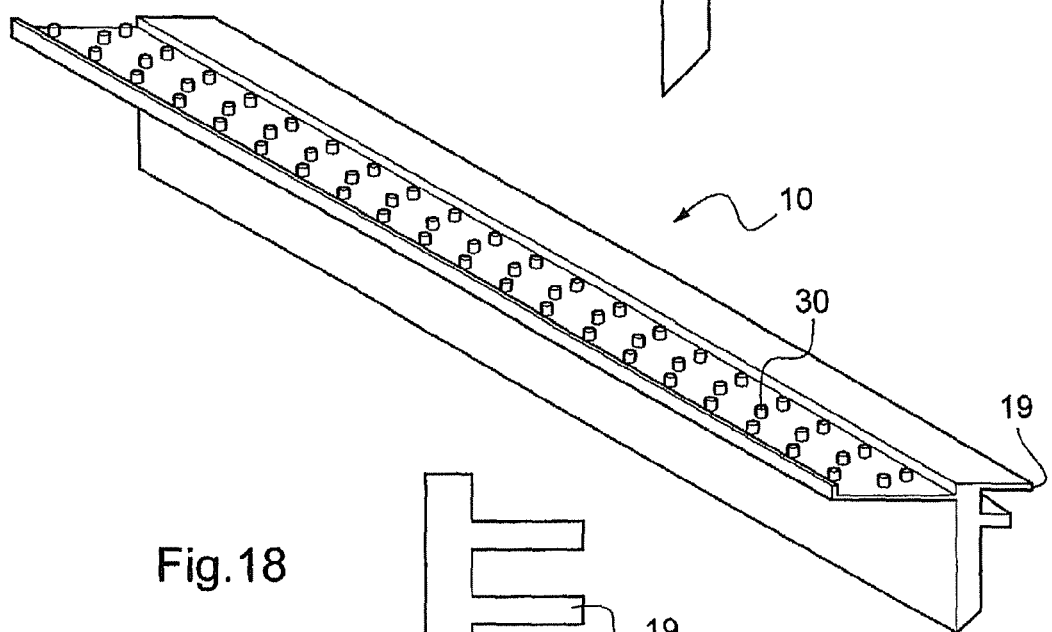

In the example of FIGS. 16 and 17, where FIG. 17 is a section on XVII-XVII of the spacer shown in FIG. 16, the disturbers 30 comprise studs.

Figure 18:
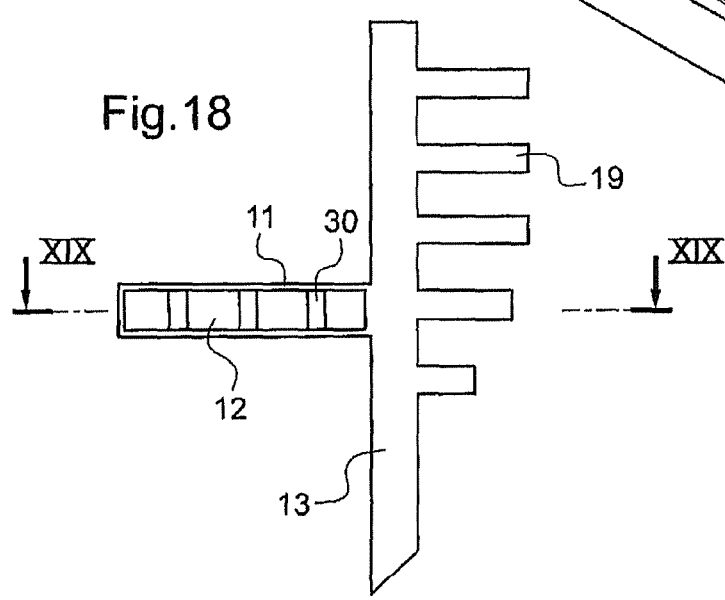
Figure 19:
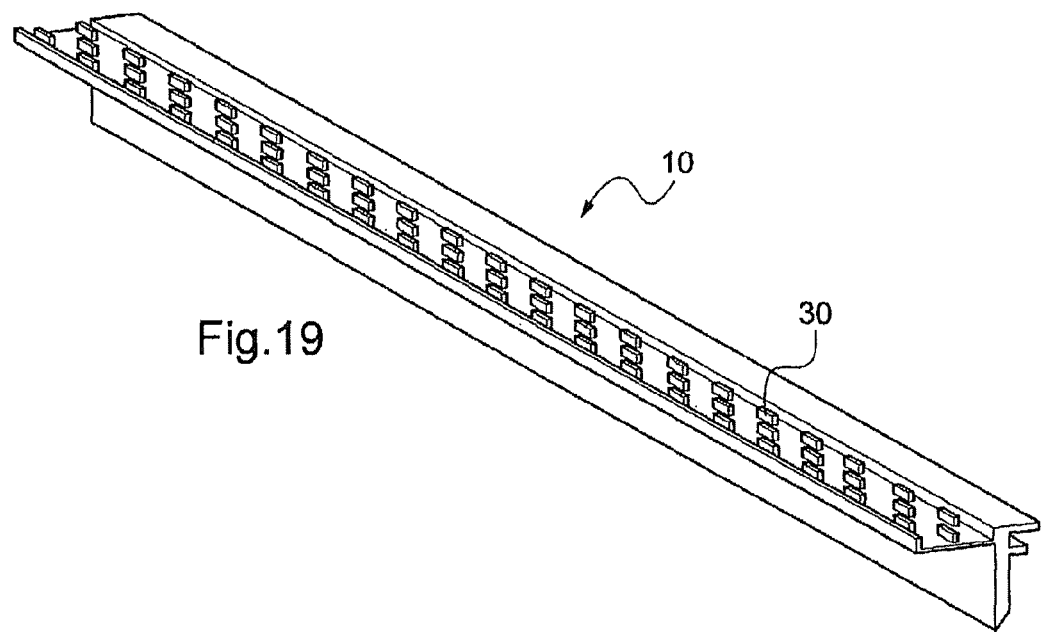

In the example of FIGS. 18 and 19, where FIG. 19 is a section on XIX-XIX of the spacer 10 shown in FIG. 18, the disturbers comprise splines, e.g. placed in a staggered configuration along the longitudinal axis.

Other spacer elements of the invention are described below with reference to FIGS. 20 and 21.

Figure 20:
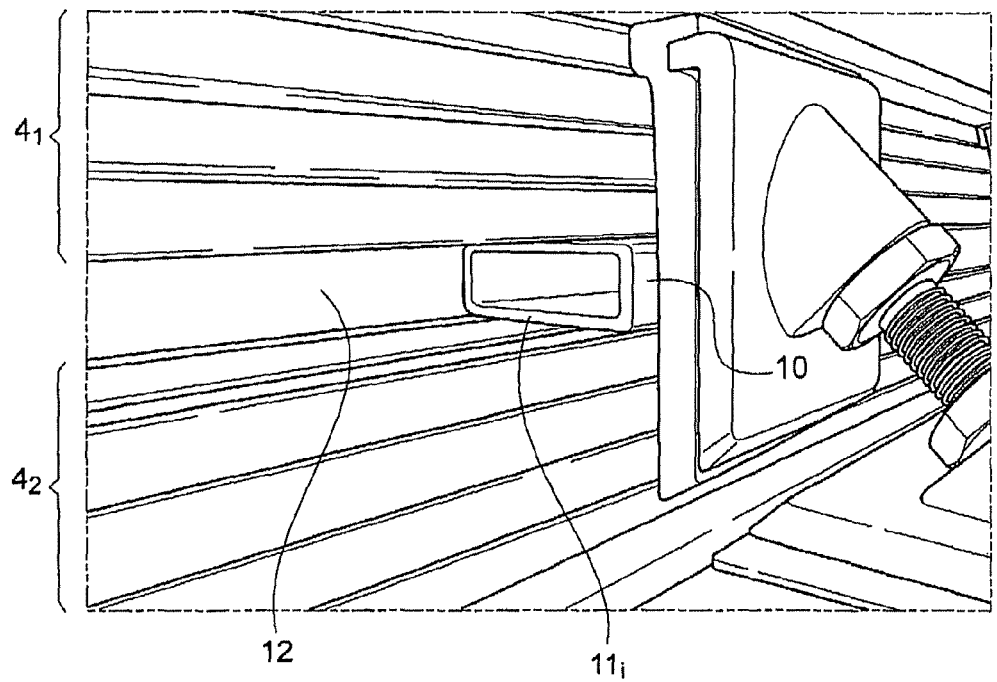

In the example shown in FIG. 20, the spacer elements $11_i$ are made using stops that present a hollow cross-section defining the ventilation channel 12 in part. In this example, the spacer 10 is distinct from the clamping system for the windings of the straight portion.

Although the stops shown in FIG. 20 are located discontinuously along the straight portion 6, it would not go beyond the ambit of the present invention for the stops to be assembled together in abutments so as to define a ventilation channel 12 that allows the cooling fluid to flow longitudinally only.

Figure 21:
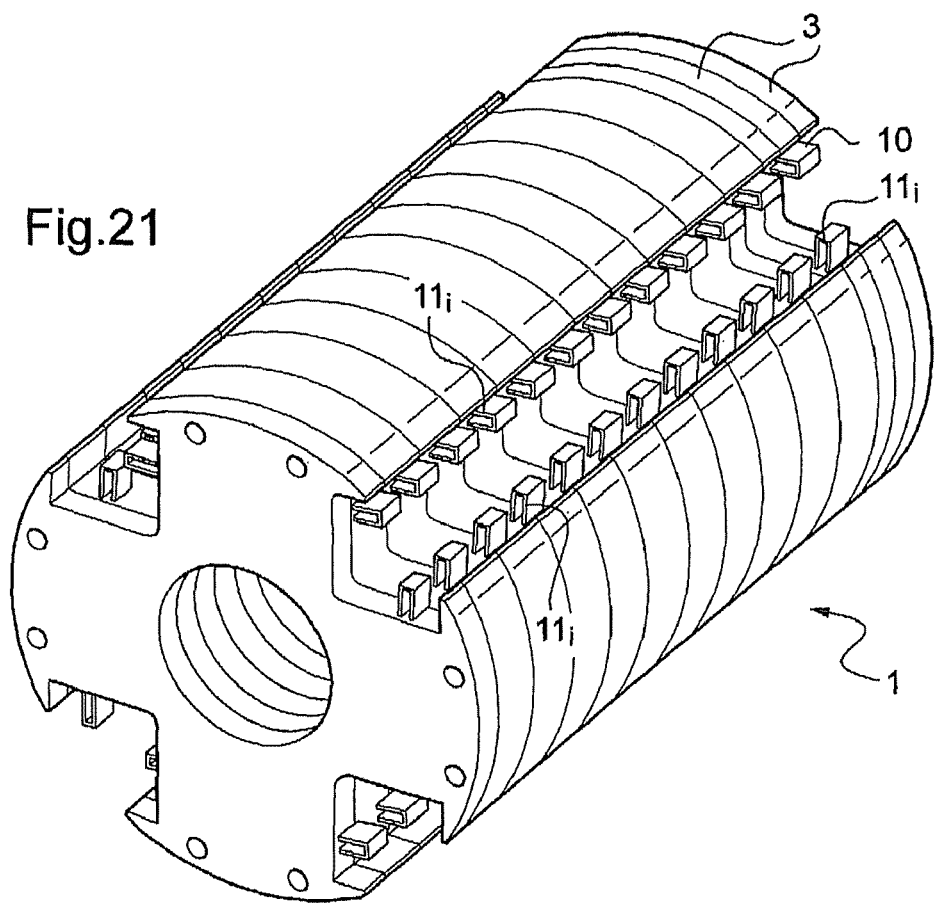
FIG. 21 is a perspective view showing an example of a stack of rotor magnetic laminations suitable for use in making a rotor of the invention.
Figure 22:
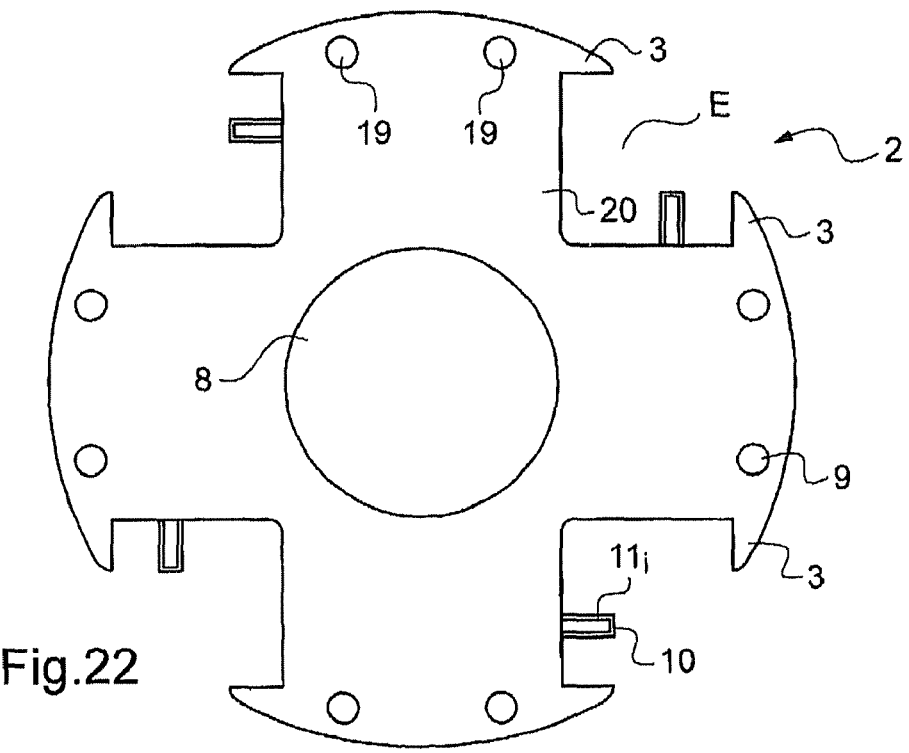
FIG. 22 shows one lamination of the FIG. 21 stack in isolation.

In a variant, as shown in FIGS. 21 and 22, the spacer 10 has spacer elements made from the magnetic laminations forming the rotor body, without using additional parts.

As can be seen in these figures, the laminations 2 of the rotor 1 have projections $11_i$ that project into the inter-pole space E, in this example.

In the example described, the projections $11_i$ extend perpendicularly to the axis along which each pole of the rotor 1 extends.

By way of example, the projections $11_i$ extend discontinuously or continuously along the longitudinal axis X.

By way of example, each of the laminations 2 forming the pole carries projections $11_i$, and these laminations are assembled together along the longitudinal axis X so that the projections $11_i$ extend continuously along said axis.

In a variant, the laminations as described above are assembled together so as to form stacks of laminations, each stack having 20 to 200 laminations. A stack of laminations is tilted relative to the axis X, being subjected to rotation about an axis perpendicular to the longitudinal axis X so as to be placed head-down relative to the adjacent stack(s) of laminations, so that the projections $11_i$ extend discontinuously along the longitudinal axis X.

The laminations 2 of the rotor in the example described also have openings 19 for receiving brackets that hold the winding overhangs.

The invention is not limited to a particular embodiment of spacer in the straight portion. The invention is also not limited to using spacers in the straight portions 6 only of the windings.

Figure 23:
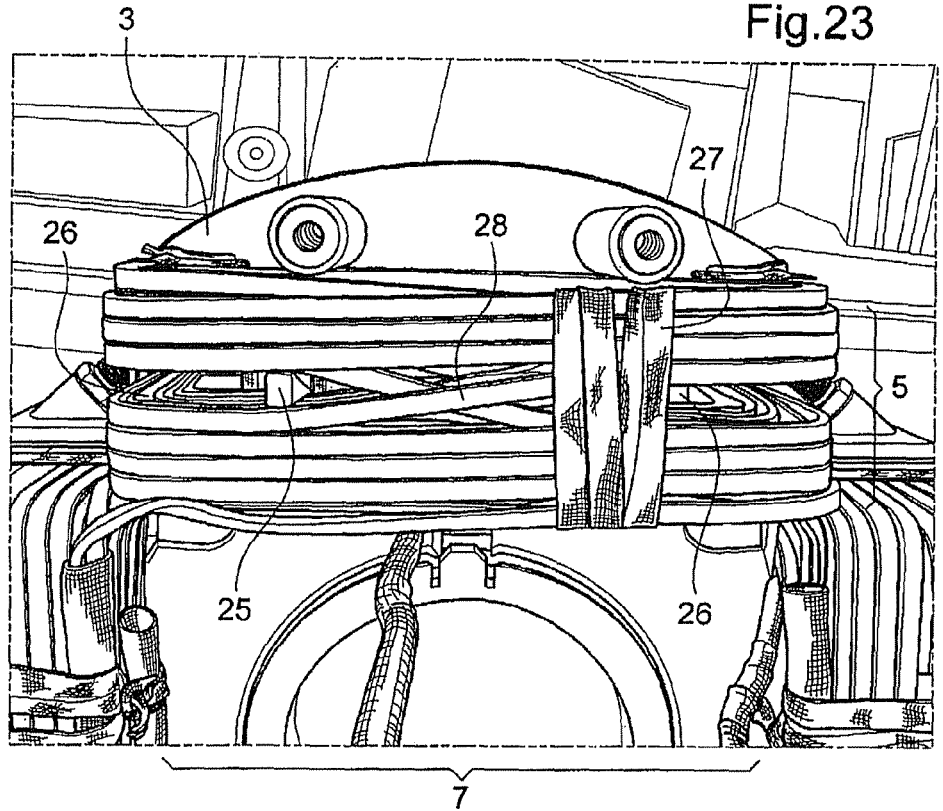
FIGS. 23 to 27 are views of the winding overhangs of an example rotor of the invention.
Figure 24:
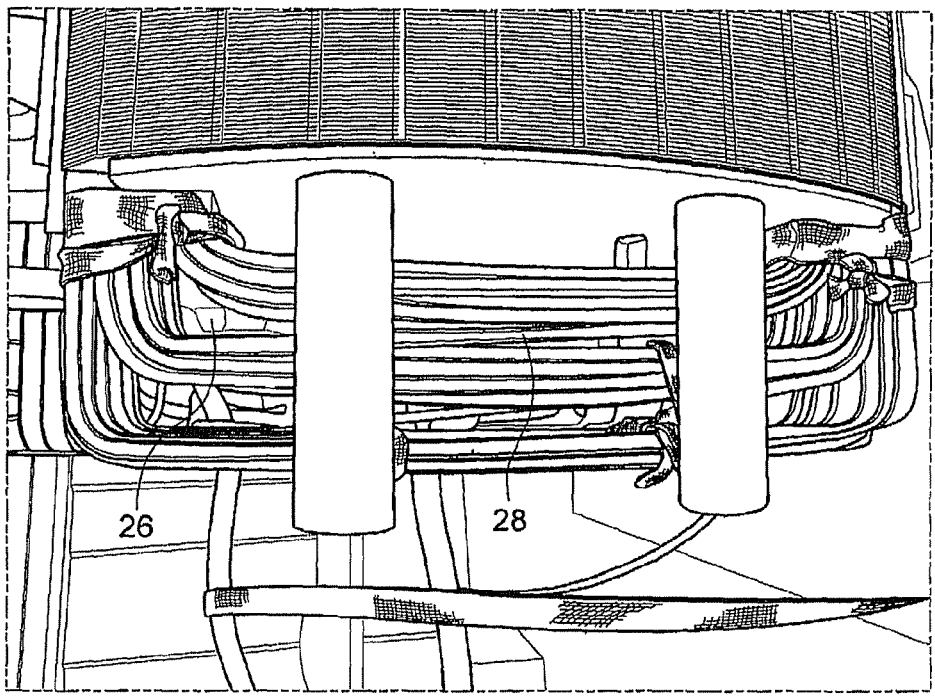

FIGS. 23 and 24 show the overhangs 7 of the windings of a pole, e.g. at the electrical feed end.

The rotor may have a spacer 25 in the winding overhang 7 serving to define one or more ventilation channels 26 within the winding overhang 7. The spacer may be made with the help of endpieces that are fastened to the main brackets of the winding overhang, and that are used both as tools for winding and as means for cooling the winding overhangs 7.

In this example, the rotor has not only main winding overhang brackets (not shown), but also two intermediate brackets 25 placed in register with the main winding overhang brackets. These intermediate brackets 25 define a ventilation channel 26 between two electrical conductor groups 4 in the winding overhang 7.

The two electrical conductor groups that define the ventilation channel 26 between them are attached by means of a band 27.

The ventilation channels 26 formed within the winding overhang may be obstructed in part by crossovers 28 between electrical conductors 4, as shown in FIGS. 23 and 24.

In the example of FIG. 23, only one ventilation channel 26 is defined within the winding overhangs 7.

The spacer 25 may also be arranged to define at least two superposed ventilation channels 26 within each winding overhang 7 in order to further improve cooling of the electrical conductors of the winding overhangs.

Figure 25:
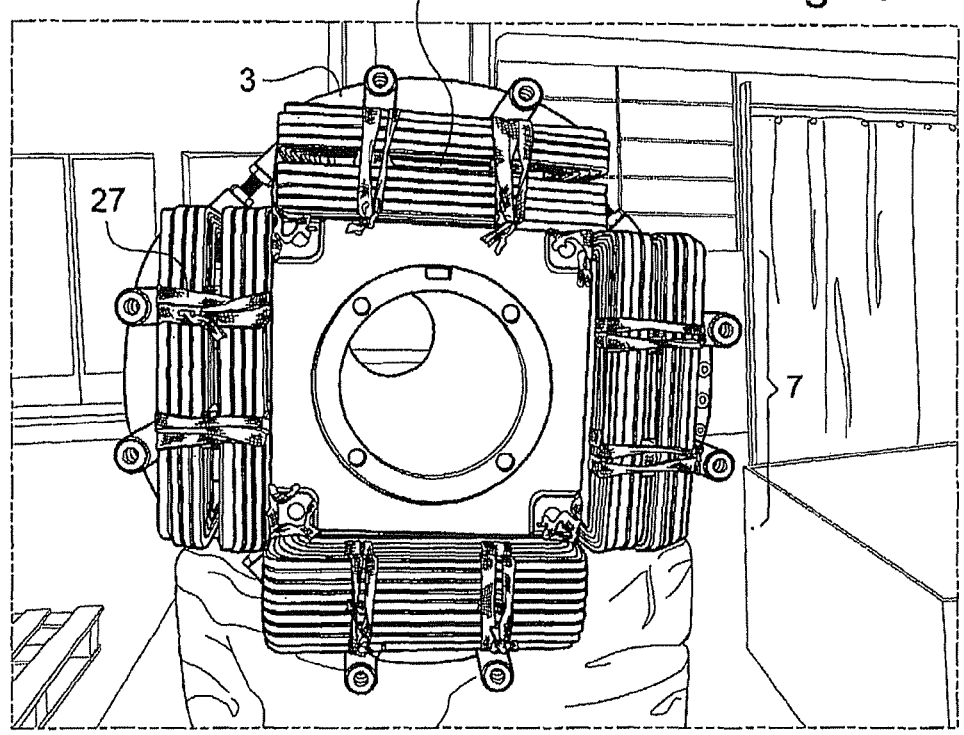
Figure 26:
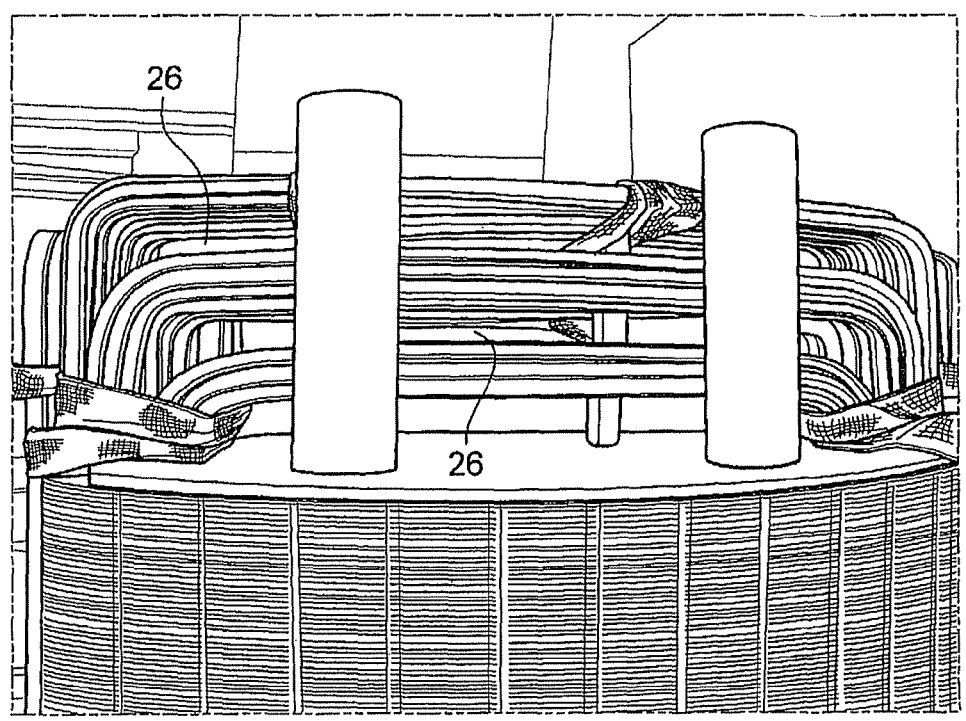

In the example of FIGS. 25 and 26, the rotor also has such a spacer 25 at its opposite longitudinal end, which opposite end may include a fan for generating a forced flow of air along the rotor.

Brackets 25 similar to those described with reference to FIG. 23, serve, for example, to define a ventilation channel 26 in the winding overhang 7 at said longitudinal end of the rotor.

The ventilation channel 26 formed within the winding overhang may extend continuously without interruption over the entire winding overhang. As can be seen in FIG. 26, the ventilation channel 26 need not be obstructed by electrical conductors.

Figure 27:
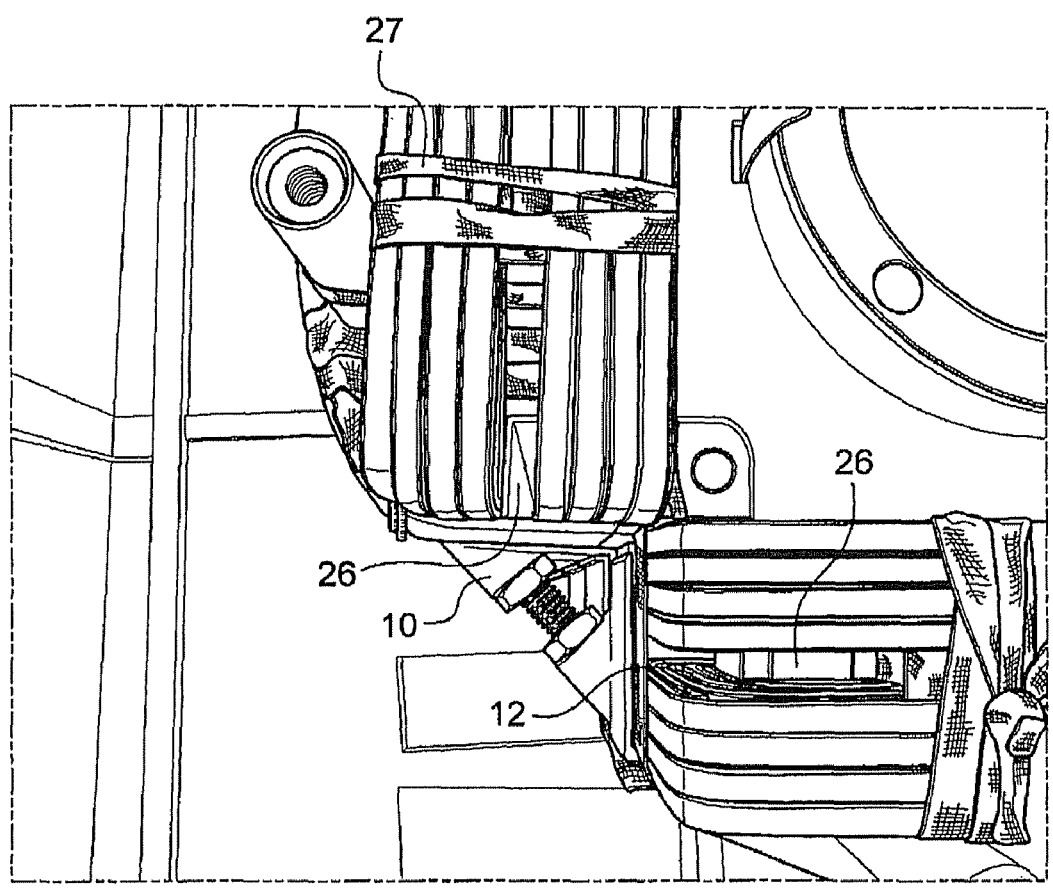

As shown in FIG. 27, the ventilation channel 12 formed within the straight portion 6 may communicate with the ventilation channel 26 formed within a winding overhang 7, so as to enable the cooling fluid to flow all around the pole.

There follows a description of an example of cooling fluid flow within the windings 5 of a pole of the rotor 1 of the invention, with the fluid being air in this example.

By way of example, the rotor 1 is incorporated in a rotary electric machine that includes a centrifugal fan. In a variant, the fan is a multiple-channel fan. In yet another variant, the fan is made by putting a centrifugal fan in series with an axial fan.

The air sucked in by the fan passes through the channel 40 situated in the inter-pole space under the windings 5. In addition, the air flows in the airgap and along the channel 41 situated between two consecutive poles, and axially through the channel(s) 12 formed within the straight portion 6 of the windings.

When the spacer 10 extends discontinuously along the straight portion 6 of the windings, e.g. as described with reference to FIGS. 1 to 10, the discontinuity enables air to flow transversely from the inter-pole space towards the ventilation channels 12.

In operation, rotation of the rotor 1 increases the tangential component of the speed of the air in the inter-pole channel 41, thereby serving to feed air again to the ventilation channel 12.

Figure 28:
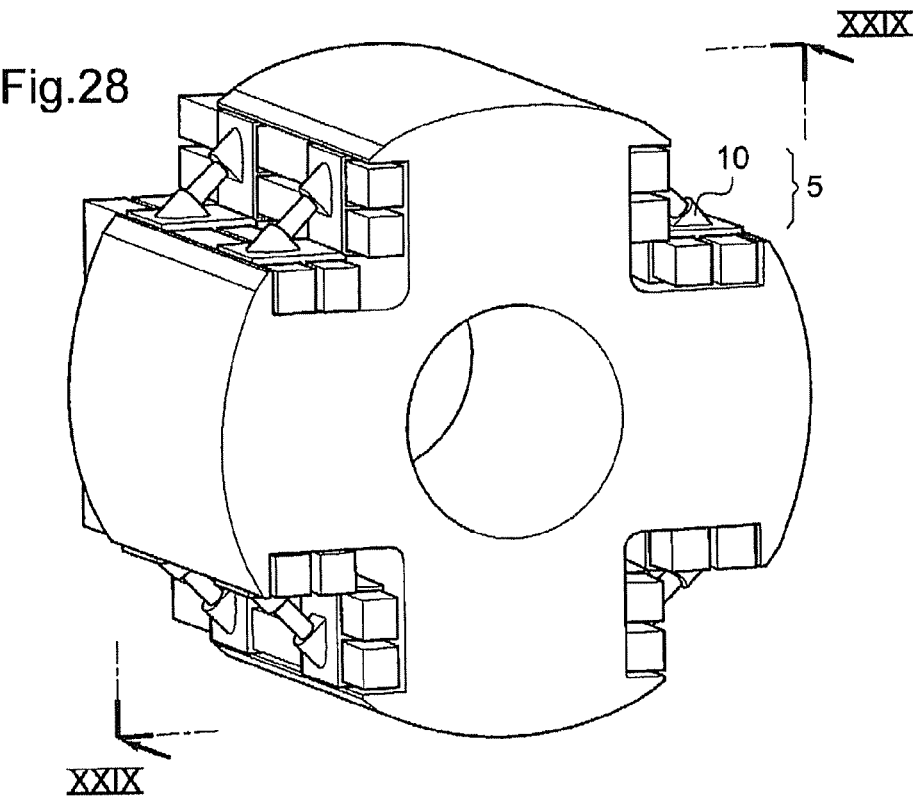
FIG. 28 is a diagrammatic and fragmentary perspective view of another rotor example of the invention.
Figure 29:
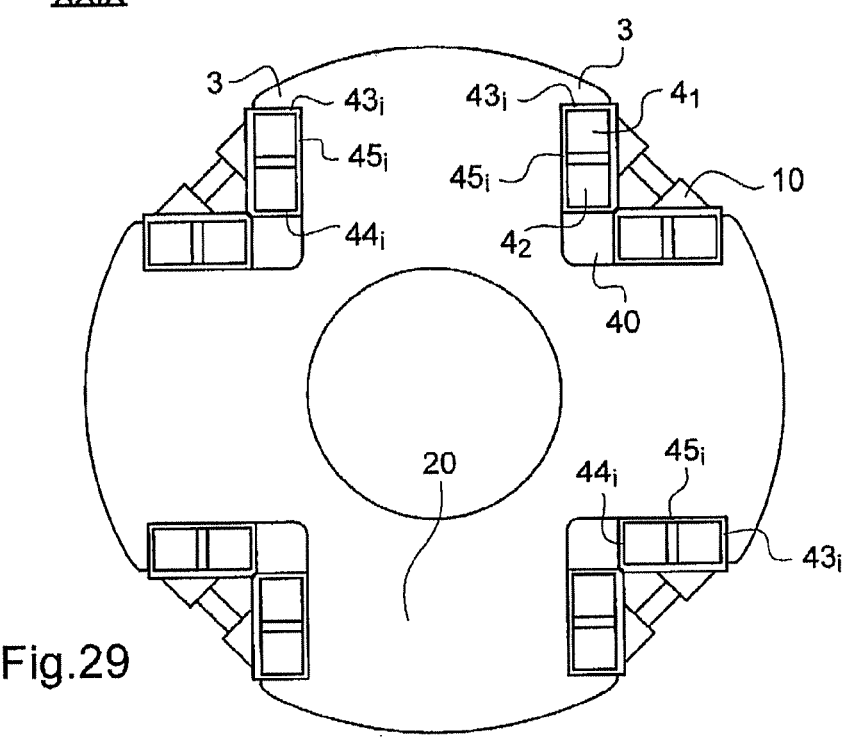
FIG. 29 is a cross-section on XXIX-XXIX of FIG. 28.

FIGS. 28 and 29 show another example of a rotor of the invention.

The example of these figures differs from that shown in FIG. 1 by the fact that each support element $13_i$ of the spacer 10 has second, third, and fourth spacer elements, given respective references $43_i$, $44_i$, and $45_i$.

As can be seen, the second spacer element $43_i$ is placed between an electrical conductor group $4_1$ of the straight portion 6 and the pole shoe 3 of the pole. The second spacer element $43_i$ serves for example to avoid any contact between the magnetic lamination 2 and the electrical conductors 4 of the windings 5.

As shown in FIGS. 28 and 29, the third spacer element $44_i$ is placed between an electrical conductor group $4_2$ of the windings and the bottom of the slot 33.

As shown, the fourth spacer element $45_i$ is placed between each electrical conductor group $4_i$ of the windings and the pole body 20.

In this example, the second spacer element $43_i$, the third spacer element $44_i$, and the fourth spacer element $45_i$ present cross-sections that are solid.

A second spacer element of solid cross-section may make it easier to transmit mechanical forces from the stack of laminations to the windings 5.

In a variant, the above-described spacer elements present cross-sections that are hollow to allow air to flow longitudinally.

In a variant, not shown, of FIGS. 28 and 29, each spacer support element $13_i$ does not have a second and/or third and/or fourth spacer element.

In a variant, not shown, a spacer extending continuously along the longitudinal axis X, as shown in FIGS. 11 and 12, may also include second, third, and fourth spacer elements as described above.

In addition, the second, third, and fourth spacer elements may be incorporated in the spacers, as described with reference to FIGS. 3 and 4.

The invention is not limited to the examples described above.

For example, it is possible to combine the various characteristics described with reference to different embodiments with one another to provide variants that are not shown.

The term "comprising a" should be understood as "comprising at least one" unless specified to the contrary.

The invention claimed is:

1. A rotor for a rotary electric machine, the rotor extending along a longitudinal axis (X) and comprising:
   at least two poles defining between them an inter-pole space; and
   windings of electrical conductors wound around the poles, said windings including straight portions extending along the longitudinal axis (X) of the rotor;
   at least one pole of the rotor including a spacer placed along at least a fraction of the straight portion between at least two conductor groups of the windings so as to form at least one cooling channel between the two conductor groups, enabling a cooling fluid to flow longitudinally and/or transversely within the windings, the spacer including at least one spacer element presenting a cross-section that is hollow, defining the cooling channel at least in part.

2. A rotor according to claim 1, at least one pole of the rotor including a spacer extending continuously along at least a fraction of the length of the straight portion so that the cooling channel allows cooling fluid to flow longitudinally only within the windings.

3. A rotor according to claim 2, the spacer element being a single element and extending between the two conductor groups continuously along the longitudinal axis.

4. A rotor according to claim 2, the spacer having a plurality of spacer elements placed along the longitudinal axis.

5. A rotor according to claim 1, at least one rotor pole including a spacer extending discontinuously along at least a fraction of the length of the straight portion so as to form at least one cooling channel enabling the cooling liquid to flow transversely and longitudinally within the windings.

6. A rotor according to claim 5, the spacer in the straight portion including a plurality of support elements placed along the longitudinal axis.

7. A rotor according to claim 6, each support element including a spacer element.

8. A rotor according to claim 1, the spacer element(s) presenting flow disturbers projecting into the channel over at least a fraction of their length(s).

9. A rotor according to claim 8, the disturbers extending over at least a fraction of the height of the channel.

10. A rotor according to claim 1 the spacer in the straight portion including spacer elements made with the help of stops inserted in the straight portion between two electrical conductor groups of the windings.

11. A rotor according to claim 1, the spacer in the straight portion being incorporated in the system for clamping the electrical conductors of the straight portion.

12. A rotor according to claim 1, the spacer in the straight portion including spacer elements made integrally with the laminations of the rotor.

13. A rotor according to claim 1, the spacer in the straight portion including at least two spacer elements located between at least two distinct electrical conductor groups, said spacer elements defining at least two superposed cooling channels.

14. A rotor according to claim 1, the ratio of the accumulated total height of the cooling channel(s) formed within the straight portion of the windings of a pole to the total height of the electrical conductors of the windings in the corresponding slot of the rotor lying in the range 1% to 50%.

15. A rotor according to claim 1, the ratio of the width of the cooling channel formed within the straight portions of the windings of a pole to the width of the corresponding slot being greater than 20%.

16. A rotor according to claim 1, the rotor poles being projecting poles including pole shoes and the spacer in the straight portion of the windings of at least one pole including at least one second spacer element placed along at least a fraction of the straight portion between a conductor group of the windings and the pole shoe.

17. A rotor according to claim 1, the spacer in the straight portion of the windings of at least one pole including at least one third spacer element placed along at least a fraction of the straight portion, in particular along the entire length of the straight portion, between a conductor group of the windings and the bottom of the inter-pole space.

18. A rotor according to claim 1, the spacer in the straight portion of the windings of at least one pole including at least one fourth spacer element placed along at least a fraction of the straight portion between a conductor group of the windings and the pole body.

19. A rotor according to claim 16, the second spacer element presenting a cross-section that is solid or hollow.

20. A rotor according to claim 1, at least one pole including a spacer in the overhangs of the windings, said spacer being positioned between at least two conductor groups of the winding overhangs.

21. A rotor according to claim 20, the spacer in the overhangs of the windings being made using endpieces fastened to main brackets of the winding overhangs.

22. A rotor according to claim 1, each conductor group including 10 to 300 electrical conductors.

23. A rotary electric machine including a rotor according to claim 1.

* * * * *